(12) United States Patent
Wichner

(10) Patent No.: US 6,635,876 B2
(45) Date of Patent: Oct. 21, 2003

(54) LOW-LOSS NON-IMAGING OPTICAL CONCENTRATOR FOR USE IN INFRARED REMOTE CONTROL SYSTEMS

(75) Inventor: Brian D. Wichner, Otter Rock, OR (US)

(73) Assignee: InFocus Corporation, Wilsonville, OR (US)

( * ) Notice: Subject to any disclaimer, the term of this patent is extended or adjusted under 35 U.S.C. 154(b) by 157 days.

(21) Appl. No.: 09/805,729

(22) Filed: Mar. 13, 2001

(65) Prior Publication Data

US 2002/0130264 A1 Sep. 19, 2002

(51) Int. Cl.[7] ................................................. G01J 5/02
(52) U.S. Cl. ........................................ 250/353; 385/93
(58) Field of Search .............................. 250/353; 385/93

(56) References Cited

U.S. PATENT DOCUMENTS

| | | | | |
|---|---|---|---|---|
| 2,994,053 A | * | 7/1961 | DeWaard | 250/338.1 |
| 4,179,619 A | * | 12/1979 | Cook | 250/239 |
| 5,039,492 A | * | 8/1991 | Saaski et al. | 356/412 |
| 5,220,462 A | * | 6/1993 | Feldman, Jr. | 126/684 |
| 5,227,632 A | * | 7/1993 | Armstrong et al. | 250/216 |
| 5,452,135 A | * | 9/1995 | Maki et al. | 250/342 |
| 5,545,896 A | * | 8/1996 | Bratt et al. | 250/338.1 |
| 5,877,500 A | * | 3/1999 | Braig et al. | 250/332 |
| 6,035,229 A | * | 3/2000 | Silverstein et al. | 600/473 |
| 6,121,675 A | * | 9/2000 | Fukamura et al. | 257/680 |
| 6,201,246 B1 | | 3/2001 | Potekev et al. | 250/353 |
| 6,301,055 B1 | * | 10/2001 | Legrand et al. | 359/368 |
| 2002/0118917 A1 | * | 8/2002 | Kawai | 385/31 |

FOREIGN PATENT DOCUMENTS

JP     05175910 A  *  7/1993  ........... H04B/10/10

* cited by examiner

Primary Examiner—David Porta
Assistant Examiner—Troy A Berchem
(74) Attorney, Agent, or Firm—Schwabe, Williamson & Wyatt, PC

(57) ABSTRACT

Infrared radiation receivers (40, 72) of this invention include non-imaging optical concentrators (18, 70) having light exit surfaces (52, 86); a light sensor (46) having a light entrance surface that is separated from the light exit surface by a small air gap (53); and a soft, pliable, light transmissive medium (100, 110) inserted in the gap to reduce the light transmission loss across the gap. The soft, pliable medium is held in place by either a recess (116) in the concentrator or by a surrounding annular ring (104).

14 Claims, 3 Drawing Sheets

LOW-LOSS NON-IMAGING OPTICAL CONCENTRATOR FOR USE IN INFRARED REMOTE CONTROL SYSTEMS

TECHNICAL FIELD

This invention relates to low-loss non-imaging optical concentrators and more particularly to an infrared ("IR") receiver optical system employed in remote control systems of multimedia projectors.

BACKGROUND OF THE INVENTION

Projection systems have been used for many years to project motion pictures and still photographs onto screens for viewing. In the recent past, slide and overhead transparency projectors were commonly used for conducting sales demonstrations, business meetings, and classroom instruction. Slide projectors were commonly controlled by a remote control unit that was electrically connected to the slide projector by a cable that allowed a presenter, such as a salesperson, instructor, or project manager, to stand next to the projector or the projection screen while conducting the slide presentation. However, the cable limited the presenter's mobility and presented a tripping hazard, especially in darkened rooms.

More recently, slide and overhead presentations have been largely replaced by presentations employing multimedia projection systems. In a typical operating mode, multimedia projection systems receive video signals from a personal computer ("PC"), a tape drive, a disk drive, or some other form of image generating or storing device. The video signals may represent still, partial-, or full-motion display images of a type typically rendered by PCs. The video signals are converted in the multimedia projection system into signals that control a digitally driven imaging device that forms the image to be projected.

The presenter typically controls the multimedia projection system with a wireless IR remote control device similar to ones employed to control home television receivers. This has greatly increased the mobility of the presenter and eliminated the tripping hazard. In fact, multimedia projectors have grown in popularity to the point where they are available in diverse models suited for, among others, portable, tabletop, ceiling-hung, and rear-projected applications.

Because battery powered IR remote control devices are typically quite directional, the wide variety of possible projector placements and various possible presenter positions causes a dilemma. The presenter can usually point the IR remote control transmitter toward the multimedia projector, but proper placement of the IR receiver on the multimedia projector is indeterminate. Suitable IR receiver mounting positions may include top mounting when the presenter is standing close to the multimedia projector, front mounting when the presenter is standing near the projection screen, and rear mounting when the presenter is behind the multimedia projector. Top mounting may also be suitable in ceiling-hung applications in which the multimedia projector is hung upside down. Clearly no single IR receiver position was suitable for all applications, so prior workers placed multiple IR receivers on the major surfaces of the multimedia projectors, an unduly complex and costly solution.

Prior IR receivers are directional primarily because the optical components coupling IR energy to an IR sensor have a limited range of angular coverage. Indeed, the most common optical component is merely an optical window having a spectral filtering property that improves the signal-to-noise ratio of the sensed IR energy. Attempts to compensate for the directionality of prior IR receivers included increasing IR transmitter power and/or IR receiver sensitivity. Unfortunately, the former solution unacceptably increased battery consumption and the latter solution was marginal because receiver sensitivity was already typically maximized. In response to this need, prior workers developed an IR receiver employing an omnidirectional optical concentrator coupled to a single IR sensor having usable sensitivity to received IR energy over a wide range of azimuthal and elevation angles. This system is described in U.S. Pat. No. 6,201,246 for NON-IMAGING OPTICAL CONCENTRATOR FOR USE IN INFRARED REMOTE CONTROL SYSTEMS, which is assigned to the assignee of this application.

A problem with the above-described system is that the omnidirectional optical concentrator is mounted on the projector case and the IR sensor is mounted on a circuit board inside the projector. Manufacturing tolerances require a gap between the concentrator and the sensor, which gap creates multiple reflections of the IR signal that increases transmission loss in the system, thereby reducing the effective range of the IR remote control.

What is still needed, therefore is an IR receiver having increased sensitivity to received IR energy over a wide range of azimuthal and elevation angles.

SUMMARY OF THE INVENTION

An object of this invention is, therefore, to provide an apparatus and a method for efficiently receiving light rays propagating from multiple angles and directing them toward a light sensor.

Another object of this invention is to provide a low-loss non-imaging optical concentrator apparatus.

A further object of this invention is to provide an omnidirectional IR receiver usable with a remote controller in a multimedia projection application.

A non-imaging optical concentrator receives light rays propagating from a wide range of elevational and azimuthal angles relative to an optical axis and directs them through a low-loss medium toward a light sensor. A first embodiment of the optical concentrator includes an optically transparent body including a substantially dome-shaped convex surface of revolution formed about the optical axis and a conical concave surface of revolution formed about the optical axis and protruding into the convex surface in a direction along the optical axis in a direction toward the light sensor. The convex surface receives light rays propagating from low elevational angles and causes them to propagate through the optically transparent body, reflect off the concave surface, and propagate generally along the optical axis toward the light sensor. The concave surface further receives light rays propagating from high elevational angles and refracts them through the optically transparent body toward the light sensor. In this embodiment, the non-imaging optical concentrator is mounted to a multimedia projector housing, and the light sensor is mounted on a circuit board within the projector housing. The concentrator and housing are separated by about a 1 millimeter gap.

A second embodiment of the optically transparent body further includes a second conical concave surface of revolution formed about the optical axis and protruding from near the apex of the first conical concave surface deeper into the optically transparent body in a direction along the optical axis. The convex surface further receives light rays propagating from medium elevational angles and causes them to propagate through the optically transparent body and reflect at relatively low angles off the first and second concave surfaces in a direction generally along the optical axis toward the light sensor. In a manner similar to the first concave surface, the second concave surface further receives light rays propagating from high elevational angles and refracts them through the optically transparent body toward the light sensor. In this embodiment, the non-imaging optical concentrator is mounted to the circuit board within the projector housing and protrudes through a hole in the housing. The light sensor is also mounted to the circuit board, but because of alignment and manufacturing tolerances, is still separated from the concentrator by the gap.

This invention increases light transmission between the concentrator and the light sensor inserting a soft, pliable, optically clear light transmission medium in the air gap. The light transmission medium reduces IR transmission losses by eliminating the multiple reflections caused by material-to-air interfaces. The light transmission medium is preferably a soft material, such as silicon gel or silicon glue, that is constrained by an annular ring of rigid material to hold the light transmission medium in place during the manufacture and useful lifetime of the projector.

In an alternative embodiment of this invention, the optical concentrators include a recess in the surface facing the gap. The soft, pliable light transmission medium is inserted into the recess and allowed to protrude by an amount that gently compresses it against the light sensor.

The low-loss non-imaging optical concentrators of this invention is advantageous because only one light sensor is required to receive IR controller data propagating from a wide range of distances, elevational angles, and azimuthal angles. They are, therefore, particularly useful for use in multimedia projector applications.

Additional objects and advantages of this invention will be apparent from the following detailed description of preferred embodiments thereof that proceeds with reference to the accompanying drawings.

DETAILED DESCRIPTION OF PREFERRED EMBODIMENTS

Figure 1:
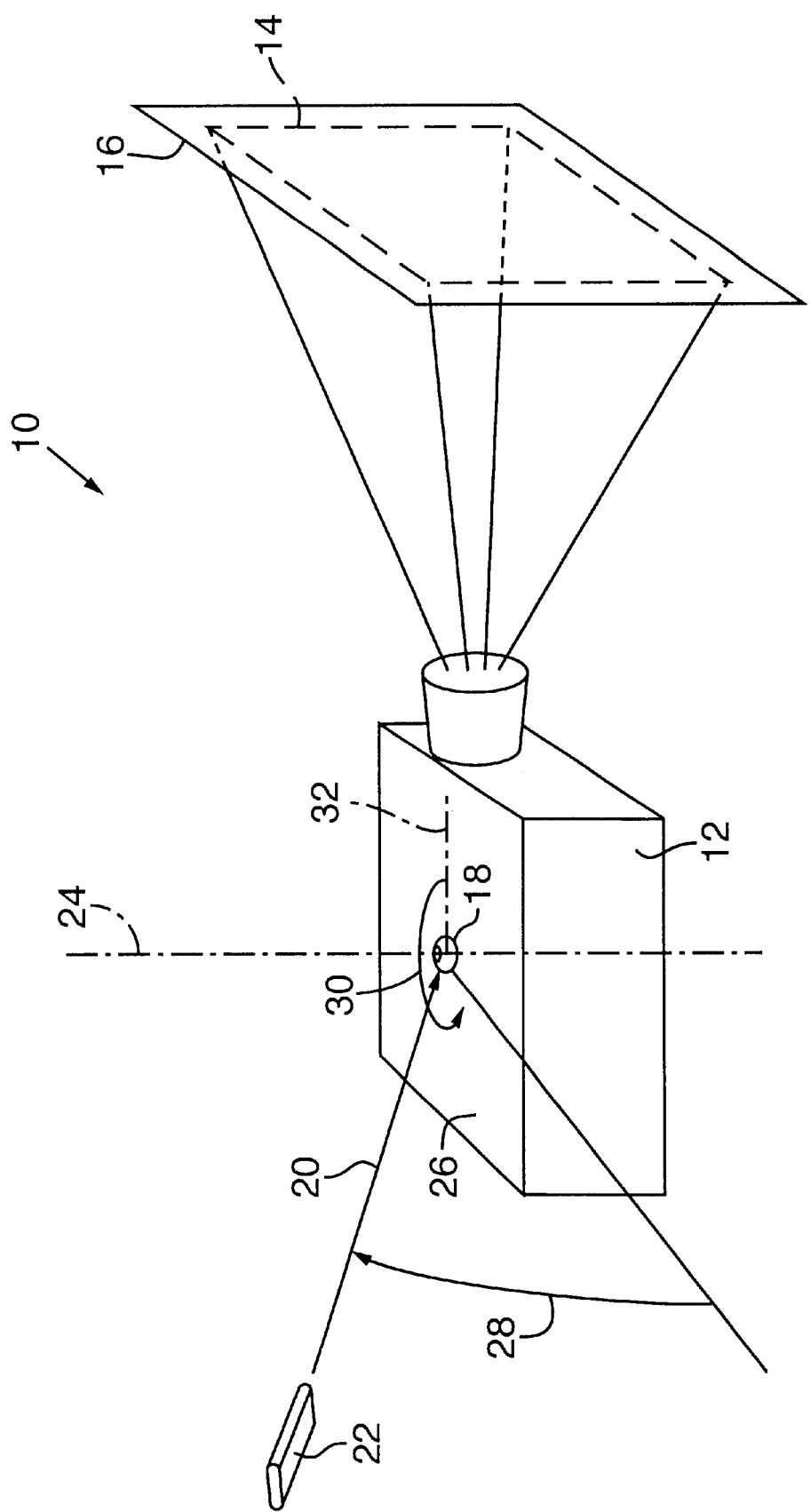
FIG. 1 is a pictorial isometric view of a multimedia projection system employing an omnidirectional IR remote control receiver of this invention.

FIG. 1 shows a projection system 10 including a multimedia projector 12 that projects an electronically generated image 14 on a projection screen 16. Multimedia projector 12 includes a non-imaging optical concentrator 18 (hereafter "optical concentrator 18") that receives light rays 20 from a remote control unit 22. Light rays 20 preferably include IR wavelengths but may include visible, ultraviolet ("UV"), and near- and far-IR wavelengths. Optical concentrator 18 has an optical axis 24 and is mounted on or protrudes through a top surface 26 of multimedia projector 12 such that optical axis 24 extends vertically in a direction substantially normal to top surface 26. In this mounting orientation, optical concentrator 18 can receive light rays 20 propagating from a wide range of elevational angles 28 and azimuthal angles 30.

As a labeling convention for this application, elevational angles 28 and azimuthal angles 30 are measured relative to an imaginary plane that is transverse to optical axis 24 and cuts through optical concentrator 18. For practical purposes the imaginary plane may be considered as being substantially coplanar with top surface 26 of multimedia projector 12. Elevational angles 28 are, therefore, expressed as angles ranging from 0 degrees (when aligned with top surface 26) to 90 degrees (when aligned with optical axis 24), and azimuthal angles 30 are expressed as 0- to 360-degree angles relative to a reference line 32 that points toward projection screen 16 and lays in top surface 26. By way of example only, FIG. 1 shows an elevational angle 28 of about 40 degrees and an azimuthal angle 30 of about 240 degrees. However, optical concentrator 18 effectively receives light rays 20 propagating from elevational angles 28 ranging from about 0 degrees to about 90 degrees and from azimuthal angles 30 ranging from about 0 degrees to about 360 degrees.

Figure 2:
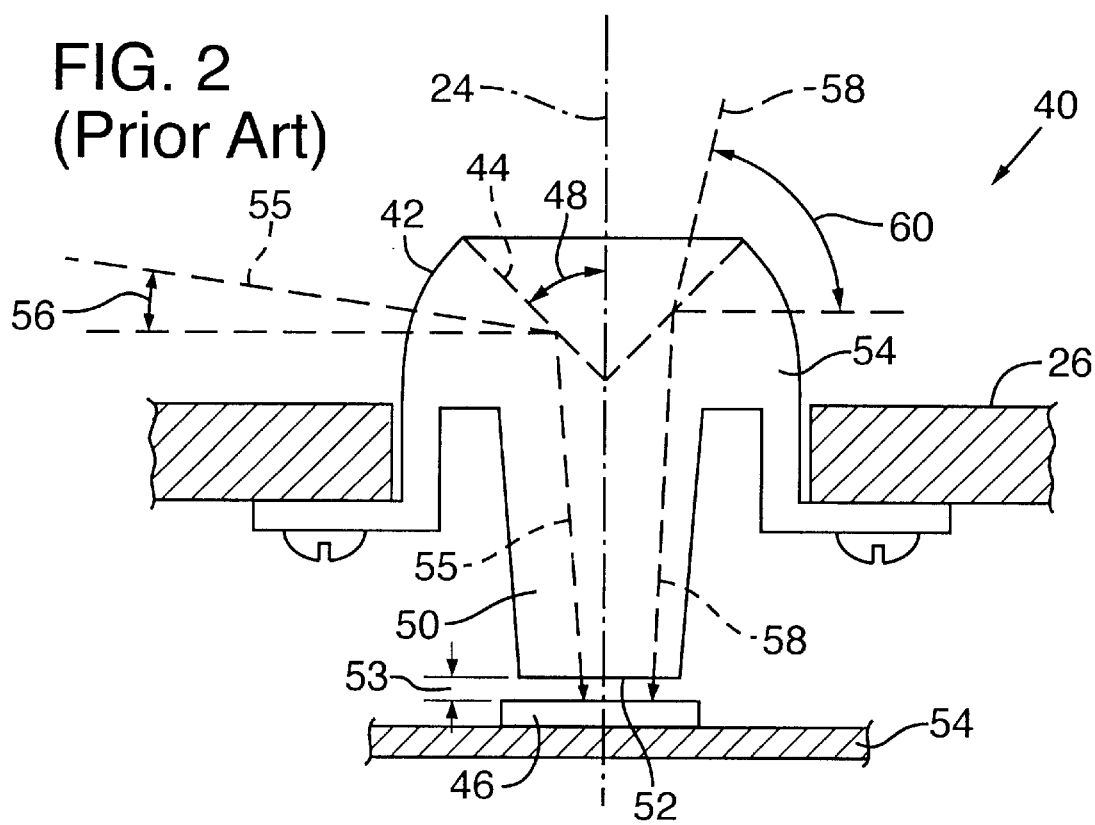
FIG. 2 is an elevation view showing a prior art housing-mounted non-imaging optical concentrator and light sensor separated by an air gap.

FIG. 2 shows a first optical concentrator 18 that is suitable for mounting to top surface 26 of projection system 10 (FIG. 1). Optical concentrator 18 is suitable for use in this invention as part of an IR receiver 40. Optical concentrator 18 includes a substantially dome-shaped convex surface 42 of revolution formed about optical axis 24 and a substantially conical concave surface 44 of revolution formed about optical axis 24 and protruding into convex surface 42 in a direction along optical axis 24 toward a light sensor 46. The apex of conical concave surface 44 is centered on optical axis 24, and conical concave surface 44 forms a tilt angle 48 measured from optical axis 24. Optical concentrator 18 further includes a light guide portion 50 that extends generally along optical axis 24 in a direction leading from convex surface 42 and concave surface 44 and toward light sensor 46. Light guide portion 50 terminates in a flat surface 52, which, for suitable coupling, is typically spaced apart by about a 1.0- to 2.0-mm air gap 53 from light sensor 46. Light sensor 46 is mounted to a circuit board 54 that is further mounted within projection system 10.

Optical concentrator 18 is formed by injection molding from optically transparent polycarbonate material, tilt angle 48 is 45 degrees, and light sensor 46 is a 3.0 mm by 3.0 mm IR sensitive photodiode. Convex surface 42 is a truncated hemisphere having about a 5.75 mm radius of curvature and concave surface 44 is a right conic surface having about an 8.0 mm base diameter and about a 4.0 mm height. Light guide portion 50 is about a 9.3 mm long tapered cylinder having about a 5.0 mm diameter where it terminates at flat surface 52.

Optical concentrator 18 receives at convex surface 42 first light rays 55 propagating from any of azimuthal angles 30 and from first elevational angles 56 ranging from about 0 degrees to about 15 degrees. First light rays 55 enter convex surface 42, propagate through optical concentrator 18 toward optical axis 24, are reflected off the inside of concave surface 44 in a direction generally along the optical axis through light guide portion 50, exit flat surface 52, and are detected by light sensor 46.

Optical concentrator 18 further receives at concave surface 44 second light rays 58 propagating from any of azimuthal angles 30 and from second elevational angles 60 ranging from about 75 degrees to about 90 degrees. Second light rays 58 enter concave surface 44, are refracted in a direction generally along the optical axis through light guide portion 50, exit flat surface 52, and are detected by light sensor 46.

Figure 3:
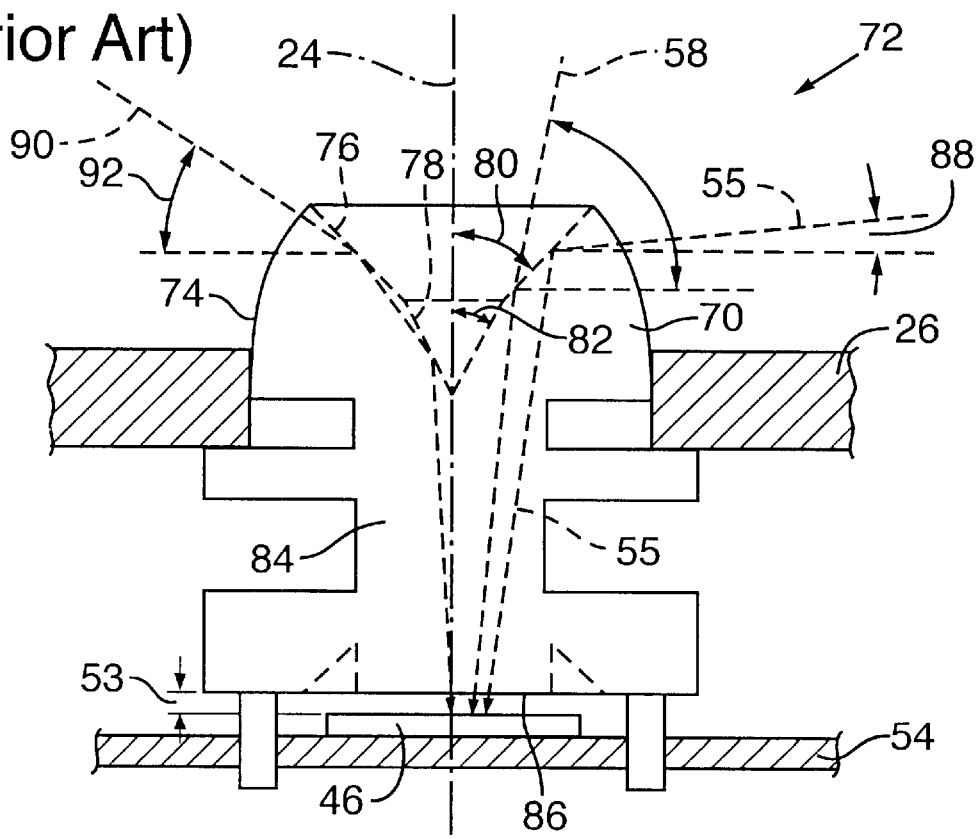
FIG. 3 is an elevation view showing a prior art circuit board-mounted non-imaging optical concentrator and light sensor separated by an air gap.

FIG. 3 shows a second optical concentrator 70 that is suitable for mounting to circuit board 54 and protruding through top surface 26 of projection system 10 (FIG. 1). Optical concentrator 70 is suitable for use in this invention as part of an IR receiver 72. Optical concentrator 70 includes a substantially dome-shaped convex surface 74 of revolution formed about optical axis 24, a substantially conical truncated concave surface 76 of revolution formed about optical axis 24, and a substantially conical concave surface 78 of revolution formed about optical axis 24. Truncated concave surface 76 protrudes at a first tilt angle 80 into convex surface 74, and conical concave surface 78 protrudes at a second tilt angle 82 further into convex surface 74. The apex of conical concave surfaces 76 and 78 are centered on optical axis 24, first tilt angle 80 is preferably about 45 degrees, and second tilt angle 82 is preferably about 26.6 degrees. Optical concentrator 70 further includes a light guide portion 84 that extends generally along optical axis 24 in a direction leading from conical concave surface 78 and toward light sensor 46. Light guide portion 84 terminates in an exit surface 86, which, for suitable coupling, is typically spaced apart by 1.0- to 2.0-mm air gap 53 from light sensor 46. As before, light sensor 46 is mounted to circuit board 54 that is further mounted within projection system 10.

Optical concentrator 70 is formed by injection molding from optically transparent polycarbonate material. Convex surface 74 is preferably a truncated hemisphere having about a 5.75 mm radius of curvature, truncated concave surface 76 is preferably a truncated right conic surface having about a 7.990 mm base diameter and about a 2.0 mm height, and conical concave surface 78 is preferably a right conical surface having about a 3.0 mm base diameter and a 2.995 mm height. Light guide portion 84 is preferably about a 9.63 mm long cylinder having about a 4.0 mm diameter.

Optical concentrator 70 receives at convex surface 74 first light rays 55 propagating from any of azimuthal angles 30 and from first elevational angles 88 ranging from about 0 degrees to about 25 degrees. First light rays 55 enter convex surface 74, propagate through optical concentrator 70 toward optical axis 24, are reflected off the inside of truncated concave surface 76 in a direction generally along optical axis 24 and through light guide portion 84, exit surface 86, and are detected by light sensor 46.

Optical concentrator 70 further receives at truncated concave surface 76 or conical concave surface 78 second light rays 58 propagating from any of azimuthal angles 30 and from second elevational angles 60 ranging from about 75 degrees to about 90 degrees. Second light rays 58 enter truncated concave surface 76 or conical concave surface 78, are refracted in a direction generally along optical axis 24 and through light guide portion 84, exit surface 86, and are detected by light sensor 46.

Optical concentrator 70 still further receives at convex surface 74 third light rays 90 propagating from any of azimuthal angles 30 and from third elevational angles 92 ranging from about 25 degrees to about 45 degrees. Third light rays 90 enter convex surface 74, propagate through optical concentrator 70, are reflected at a first shallow angle off the inside of truncated concave surface 76, are reflected again at a second shallow angle off the inside of conical concave surface 78, propagate in a direction generally along optical axis 24 and through light guide portion 84, exit surface 86, and are detected by light sensor 46.

The materials forming optical concentrators 18 and 70 determine their spectral transmission properties. For detecting visible and near IR light rays, preferred materials include optical glasses, plastics, and, in particular, polycarbonate. For detecting UV light rays, a preferred material is quartz. For detecting IR light rays, preferred materials include quartz, zinc selenide, and germanium-doped materials. Wavelength-selective filtering dyes may be added to the materials to attenuate undesirable ambient light wavelengths, such as from fluorescent lighting. Adding such dyes or, alternatively, a discrete optical filter improves the signal-to-noise ratio of remote controller signals detected by light sensor 46.

Alternative embodiments of optical concentrators 18 and 70 may be optimized to detect light rays propagating from longer distances and smaller ranges of elevational angles or from shorter distances and larger ranges of elevational angles. The parameters of optimization available include changing the size and curvature (shape) of convex surfaces 42 and 74; tilt angles 48, 80, and 82; the area, shape, size, and orientation of concave surfaces 44, 76, and 78; the area and curvature of exit surface 86; and the refractive index and spectral transmission properties of the optical concentrator material. In addition to the spherical and conical surface shapes shown, cylindrical, faceted, elliptical, parabolic, hyperbolic, and combinations thereof may suit particular light detecting applications. Of course, the surfaces need not be symmetrical surfaces of revolution, but may be angularly biased to favor reception of light rays propagating from low elevational angles over a first range of azimuthal angles and to favor reception of light rays propagating from higher elevational angles over a second range of azimuthal angles.

Typically tilt angles 48, 80, and 82 are adjusted to optimize light ray reception over a particular range of elevational angles. In applications in which the light rays propagate from a broader range of elevational angles and a minimal range of distances is required over any azimuthal angle, a compound optical concentrator, such as the one shown in FIG. 3, is preferred.

In general, optical concentrators of this invention operate in two primary modes. For receiving light rays propagating from low elevational angles (greater than the tilt angle) the optical concentrator works in reflective mode, and for receiving light rays propagating from higher elevational angles (less than the tilt angle) the optical concentrator works in refractive mode. This dual mode operation is referred to as aperture sharing, which results in a compact, relatively simple IR receiver employing a single IR sensor and having usable sensitivity to received IR energy over a wide range of azimuthal and elevation angles.

It has been discovered that air gap 53 contributes to transmission loss of light rays 55, 58, and 90 propagating between optical concentrators 18 and 70 and light sensor 46. The transmission loss is caused by multiple reflections between concentrator surfaces 52 and 85 and the surface of light sensor 46. Unfortunately, the light transmission loss reduces the useful range between remote control unit 22 (FIG. 1) and projection system 10 (FIG. 1).

Figure 4A:
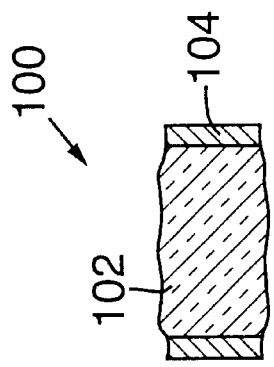
FIGS. 4A and 4B show respective plan and elevational section views of a first embodiment of a light transmission medium of this invention.
Figure 4B:
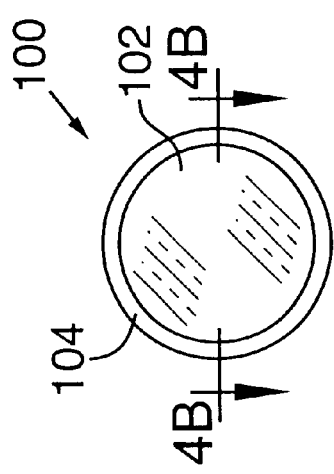

FIGS. 4A and 4B show a first embodiment of a light transmission medium 100 (hereafter "medium 100") of this invention that reduces light transmission losses between concentrator 18 and light sensor 46, thereby increasing the useful range between remote control unit 22 (FIG. 1) and projection system 10 (FIG. 1). Medium 100 includes a soft, pliable, optically clear material 102, such as a silicon gel or preferably a silicon glue. Material 102 is constrained by an annular ring 104 of rigid material that holds material 102 in place during the manufacture and useful lifetime of medium 100.

Figure 5:
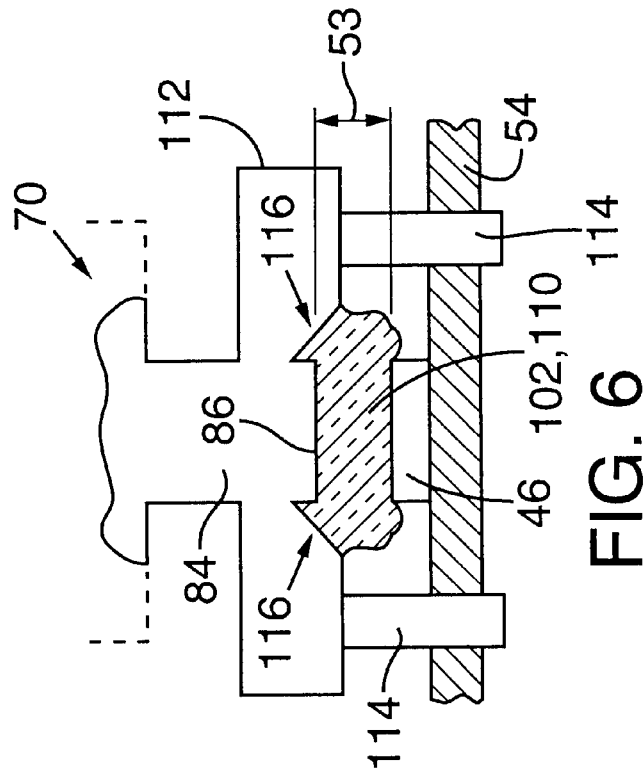
FIG. 5 is a sectional elevation view showing the light transmission medium of FIGS. 4A and 4B employed with the non-imaging optical concentrator and light sensor of FIG. 2.

FIG. 5 shows medium 100 inserted into air gap 53 between light sensor 46 and flat surface 52 of IR receiver 40. Medium 100 effectively eliminates air gap 53, thereby reducing IR transmission losses by eliminating the multiple reflections caused by the above-described material-to-air interfaces. Material 102 is sufficiently soft and pliable to conform to the surfaces of light sensor 46 and light guide portion 50.

Medium 100 is preferably manufactured by inserting material 102 into annular ring 104; pressing material 102 between a pair of substantially parallel flat surfaces coated with a release agent, such as waxed paper; allowing material 102 to cure; removing the flat surfaces; pressing and/or sticking medium 100 to either light sensor 46 or flat surface 52; and assembling IR receiver 40 (FIG. 2).

Figure 6:
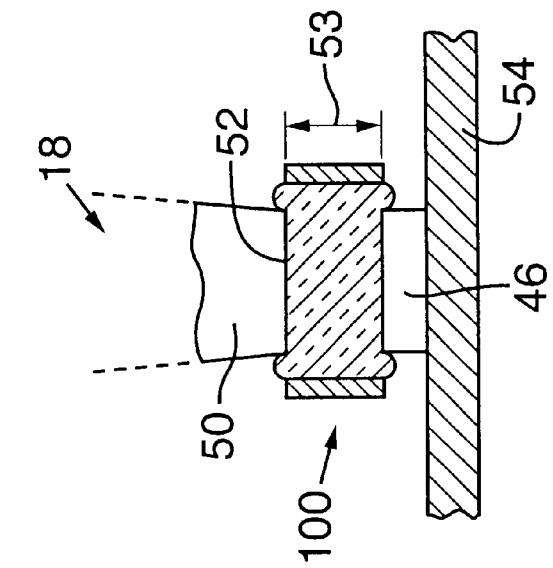
FIG. 6 is a sectional elevation view showing a second embodiment of a light transmission medium of this invention employed with the non-imaging optical concentrator and light sensor of FIG. 3.

FIG. 6 shows a second embodiment of a light transmission medium 110 (hereafter "medium 110") of this invention that reduces light transmission losses between concentrator 70 and light sensor 46, thereby increasing the useful range between remote control unit 22 (FIG. 1) and projection system 10 (FIG. 1). Medium 110 includes soft, pliable, optically clear material 102, which in this embodiment is not constrained by an annular ring.

In this embodiment, concentrator 70 includes a light guide portion 84, an exit surface 86, and a base 112 that includes posts 114 for mounting concentrator 70 to circuit board 54. A recess 116 surrounding light guide portion 86 is formed in base 112. Medium 110 is inserted into and around recess 166 and allowed to protrude a small amount, such that when assembled, medium 110 presses gently against light sensor 46.

Medium 110 is preferably manufactured by inserting material 102 into and around recess 116; pressing the exposed bottom surface of material 102 with a substantially parallel flat surface coated with a release agent, such as waxed paper; allowing material 102 to cure; removing the flat surface; and assembling IR receiver 72 (FIG. 3).

As an alternative to the above embodiments of this invention, a suitable medium may be manufactured by flattening a substantial quantity of material 102 between a pair of substantially flat surfaces coated with a release agent; curing material 102 to form a sheet of medium; removing at least one of the flat surfaces; cutting patches of the medium from the sheet of medium; sticking the patch to either the light sensor or the concentrator; and assembling the IR receiver.

Skilled workers will recognize that many changes may be made to the details of the above-described embodiments of this invention without departing from the underlying principles thereof. Accordingly, it will be appreciated that this invention is also applicable to light sensor applications other than those found in remote controls for multimedia projectors. The scope of the present invention should, therefore, be determined only by the following claims.

What is claimed is:

1. A light radiation receiver apparatus having a low light transmission loss, comprising:
    a radiation transmissive body having a light exit surface and a recess surrounding the light exit surface;
    a light sensor having a light entrance surface that is separated from the light exit surface by a gap; and
    a light transmission medium inserted in the gap and into the recess to reduce the light transmission loss across the gap.

2. The apparatus of claim 1 in which the radiation transmissive body includes a non-imaging optical concentrator.

3. The apparatus of claim 1 in which the gap has a width that ranges from about 1 millimeter to about 2 millimeters.

4. The apparatus of claim 1 in which the light transmission medium includes a soft, pliable, light transmissive material.

5. The apparatus of claim 4 in which the soft, pliable, light transmissive material includes at least one of a silicon gel and a silicon glue.

6. The apparatus of claim 1 in which the light transmission medium is surrounded by an annular ring that holds the light transmission material in place.

7. The apparatus of claim 1 in which the light radiation includes infrared radiation.

8. A method of making a light radiation receiver having a low light transmission loss, comprising:
    providing a radiation transmissive body having a light exit surface and a recess;
    providing a light sensor having a light entrance surface;
    separating from the light exit surface by a gap; and
    inserting a light transmission medium in the gap and into the recess to reduce the light transmission loss across the gap.

9. The method of claim 8 in which the radiation transmissive body includes a non-imaging optical concentrator.

10. The method of claim 8 in which the gap has a width that ranges from about 1 millimeter to about 2 millimeters.

11. The method of claim 8 in which the light transmission medium includes a soft, pliable, light transmissive material.

12. The method of claim 11 in which the soft, pliable, light transmissive material includes at least one of a silicon gel and a silicon glue.

13. The method of claim 8 further including surrounding the light transmission medium with an annular ring for holding light transmission material in place.

14. The method of claim 8 in which the light radiation includes infrared radiation.

* * * * *